United States Patent [19]

Nakabayashi et al.

[11] 4,352,749
[45] Oct. 5, 1982

[54] HOT-MELT ADHESIVE COMPOSITION

[75] Inventors: Masamitsu Nakabayashi, Osaka; Fumihiro Doura, Sakai; Reiji Miyamoto; Tetsujiro Tatsumi, both of Ichihara, all of Japan

[73] Assignee: Takeda Chemical Industries, Ltd., Osaka, Japan

[21] Appl. No.: 235,028

[22] Filed: Feb. 17, 1981

[30] Foreign Application Priority Data

Feb. 14, 1980 [JP] Japan ................................ 55-17364

[51] Int. Cl.$^3$ ..................... C08L 91/08; C08L 93/00
[52] U.S. Cl. ..................................... 525/149; 525/64; 525/68; 525/75; 525/80; 525/211; 525/222
[58] Field of Search ................... 260/28.5 AV, 27 EV; 525/64, 75, 68, 80, 211, 222

[56] References Cited

U.S. PATENT DOCUMENTS

| | | | |
|---|---|---|---|
| 2,703,794 | 3/1955 | Roedel | 526/331 |
| 3,896,069 | 7/1975 | Kosaka et al. | 260/28.5 AV |
| 3,926,878 | 12/1975 | Shimizu et al. | 260/28.5 AV |
| 4,078,128 | 3/1978 | Hoyt et al. | 526/331 |

FOREIGN PATENT DOCUMENTS

| | | |
|---|---|---|
| 001875 | 5/1979 | Eurpoean Pat. Off. . |
| 52-37488 | 9/1977 | Japan . |
| 55-13718 | 1/1980 | Japan . |

Primary Examiner—Theodore E. Pertilla
Attorney, Agent, or Firm—Wenderoth, Lind & Ponack

[57] ABSTRACT

A hot-melt adhesive composition containing (i) a first component consisting of (a) 20 to 100 weight percent of a hydrolyzed ethylene-vinyl acetate copolymer whose vinyl acetate unit content is in the range of 5 to 50 weight percent and its hydrolysis degree is at least 50 percent and/or a carboxyl-containing product obtained by grafting said copolymer with a carboxyl-containing unsaturated compound or anhydride thereof and (b) 0 to 80 weight percent of a resin compatible with said copolymer and/or said carboxyl-containing product and (ii) a second component which is a tackifying resin, the proportion of said first component being not less than 20 weight percent and that of said second component being not less than 20 weight percent, both based on said two components, and said composition optionally may further contain (iii) a wax as a third component is highly improved in adhesivity as compared with the hitherto known hot-melt adhesive compositions.

9 Claims, No Drawings

HOT-MELT ADHESIVE COMPOSITION

BACKGROUND OF THE INVENTION

This invention relates to a hot-melt adhesive composition having highly improved adhesivity.

In view of its superior adhesive power, an ethylene-vinyl acetate copolymer or a hydrolyzed copolymer thereof has already been used as a component for a hot-melt adhesive composition. For instance, Japanese Pat. publication No. 37488/1977 Specification discloses a hot-melt adhesive composition containing a hydrolyzed ethylene-vinyl acetate copolymer, waxes and tackifying resins such as rosine. However, such hitherto known hot-melt adhesive copositions do not always provide satisfactory adhesive power.

To overcome the disadvantage, the present inventors conducted studies and succeeded in obtaining a hot-melt adhesive composition having a considerably increased adhesive power by using a hydrolyzed ethylene-vinyl acetate copolymer with a degree of hydrolysis not less than 50% to the acetate groups in the copolymer and/or a carboxyl-containing product obtained by grafting said hydrolyzed copolymer with carboxyl-containing unsaturated monomers, in combination with a tackifying resin in a specified ratio.

SUMMARY OF THE INVENTION

This invention is therefore concerned with a hot-melt adhesive composition containing (i) a first component consisting of (a) 20 to 100 weight percent of a hydrolyzed ethylene-vinyl acetate copolymer whose vinyl acetate unit content is in the range of 5 to 50 weight percent and its hydrolysis degree is at least 50 percent (sometimes briefly, HEVA) and/or a carboxyl-containing product obtained by grafting said copolymer with a carboxyl-containing unsaturated compound or anhydride thereof (sometimes briefly, HEVA-C) and (b) 0 to 80 weight percent of a resin compatible with said copolymer and/or said carboxyl-containing product and (ii) a second component which is a tackifying resin, the proportion of said first component being not less than 20 weight percent and that of said second component being not less than 20 weight percent, both based on said two components, and said composition optionally may further contain (iii) a wax as a third component.

DETAILED DESCRIPTION OF THE INVENTION

The first component may be any species of HEVA and/or HEVA-C or a mixture of such species, and further may be added a resin compatible therewith at room temperature, wherein the content of HEVA and/or HEVA-C is not less than 20 weight %.

The ethylene-vinyl acetate copolymer (EVA) as a raw material of HEVA is produced by the high-pressure method (U.S. Pat. Nos. 2,200,429; 2,703,794; Fr. Pat. No. 1,381,859) and contains 5 to 50 weight % of vinyl acetate units. If the vinyl acetate content is less than 5 weight %, the composition is only comparable in performance with a polyethylene-based adhesive, thus its adhesive strength being very weak. If the vinyl acetate content is over 50 weight %, the resulting adhesive agent does not have adequate water resistance. The ethylene-vinyl acetate copolymer usable in this invention has a melt index of 0.1 to 400 g/10 minutes (190° C., load 2160 g, 10 min. ASTM D-1238 Revised), preferably 0.5 to 400 g/10 min.

HEVA is obtainable by hydrolyzing such an ethylene-vinyl acetate copolymer and this reaction can be conducted in the same manner as the ordinary hydrolysis process (U.S. Pat. No. 2,386,347). For example, it can be conducted in a system comprising a low-boiling alcohol (e.g. methanol, ethanol) and alkali (e.g. sodium hydroxide, potassium hydroxide, sodium methoxide). Furthermore, this reaction may be conducted in the presence of a hydrocarbon solvent (e.g. benzene, toluene, xylene).

It is essential that the degree of hydrolysis be in excess of 50%, and otherwise, no satisfactory adhesivity can be obtained as already mentioned. The preferred range of hydrolysis degree is within from 50% to about 98%.

The above-mentioned HEVA-C can be obtained by grafting HEVA with a carboxyl-containing unsaturated compound or an anhydride thereof. This grafting reaction can be carried out in a homogeneous solution or melt system or in a non-homogeneous system. The grafting ratio is generally advisable to react 0.05 to 15 weight %, preferably about 0.1–2 weight % of said carboxyl-containing unsaturated compound or anhydride with HEVA. The said unsaturated compound includes acrylic acid, methacrylic acid, crotonic acid, itaconic acid, maleic acid, etc. and said anhydride includes maleic anhydride, succinic anhydride, trimellitic anhydride, itaconic anhydride, etc. Among these, acrylic acid is preferably employed. These monomers can be used alone or in combination with other ethylenically unsaturated monomers such as styrene, acrylic acid esters, etc. The HEVA graft polymer can be obtained by heating such a monomeric compound with HEVA and a radical polymerization initiator (e.g. benzoylperoxide, lauroylperoxide, dicumylperoxide, azobisisobutyronitrile) at a temperature over the decomposition point of the initiator, for example, at around 50° C. to 200° C.

As the resin compatible with the hydrolyzed ethylene-vinyl acetate copolymer and/or the carboxyl-containing product, there may be mentioned an ethylene-vinyl acetate copolymer (EVA) as defined hereinbefore as a raw material of HEVA.

The second component, a tackifying resin, may be any species of the so-called tackifiers for already-known hot-melt adhesive compositions. Thus, for example, rosin and rosin derivatives such as wood rosin, stabilized rosin, polymeric rosin, hydrogenated rosin, esterified rosin, etc., terpene resin, terpene-phenol copolymer, i.e. a copolymer of β-pinene and phenol resins and other modified terpene resins, coumarone-indene resin, aliphatic petroleum resin, aromatic petroleum resin, hydrogenated aromatic petroleum resin, hydrogenated and copolymeric petroleum resins, and dicyclopentadiene petroleum resins such as Quintone 1500 ®, Quintone 1525 ® and Quintone 1700 ® (all made by Japan Zeon Co., Ltd. in Japan) may be mentioned.

Among these tackifying resins, preferred are terpene-phenol copolymers, hydrogenated aromatic petroleum resins and dicyclopentadiene petroleum resins.

The hot-melt adhesive composition according to this invention may be a mixture consisting only of said first and second components, but may include at least one wax compatible with these components. The amount of such wax may be optional only if the proportions of said first and second components are respectively within the specified ranges. For example, 1 to 100 weight parts of a wax is mixed with 100 parts of total amount of the first and second components.

Thus, one embodiment of the present invention is a hot-melt adhesive composition containing the first and second components as defined hereinbefore and there may be mentioned, as another embodiment of the present invention, the composition may further contain a wax. As examples of said wax, there may be mentioned petroleum waxes such as paraffin wax, microcrystalline wax, etc., Fischer-Tropsch wax and its derivatives, synthetic hydrocarbon waxes such as low molecular polyethylene and its derivatives, hydrogenated waxes such as castor wax, opal wax, etc., polypropylene waxes such as atactic polypropylene, etc. and so on. The incorporation of such wax helps reduce the viscosity of the hot-melt adhesive composition of this invention and thereby improve its workability, prevents threading or brocking after coating, helps to adjust the open time, and to improve the resistance to heat.

When a wax is to be incorporated in the present composition, it is preferable to use as said second component, dicyclopentadiene petroleum resins, i.e. a copolymer of a cyclopentadiene monomer with a vinyl ester (hereinafter referred to as copolymerized DCPD resin). The copolymerized DCPD resin can be produced, for example, in the following manner. Thus, a monomeric mixture of a cyclopentadiene or its dimer such as cyclopentadiene, methylcyclopentadiene and dicyclopentadiene and a vinyl ester such as vinyl acetate or vinyl propionate or allyl acetate is heated in the absence of a solvent or in the presence of a hydrocarbon solvent such as benzene, toluene, xylene or hexane and in an inert gaseous atmosphere at a temperature of 200° to 300° C., preferably 250° to 280° C., for 0.5 to 20 hours, preferably 1 to 10 hours. The detailed manners for preparation are, for example, disclosed in Japanese Patent Application (non-examined) Laid-Open No. 77688/1976. The resultant copolymerized DCPD resin desirably has a softening point not over 170° C. and a saponification value in the range of 60 to 400. The use of such a copolymerized DCPD resin as the second component permits production of a completely homogeneous composition of said first and second components, though any wax is added thereto.

Waxes which are especially preferred when the second component is the above-mentioned copolymerized DCPD resin include solid paraffin waxes obtainable by fractional distillation of petroleum oil, i.e. based on $C_{20-30}$ saturated hydrocarbons (110° F. to 150° F.), microcrystalline wax which has a higher molecular weight, polyethylene wax as a byproduct of polyethylene production, and chlorinated versions of the above-mentioned waxes and so on. These waxes can be used alone or in admixture.

For the purpose of achieving an increased resistance to oxidation, there may be incorporated in the composition such oxidation inhibitors, antioxidants, as 2,6-di-tert butyl-4-methylphenol, 4,4-thiobis(6-tert butyl-m-cresol), etc.

In the composition of this invention, the proportion of said first component is at least 20 weight %, preferably 30 to 70 weight %, and that of said second component is at least 20 weight %, preferably 30 to 70 weight %, based on two components. If the proportion of the first component is less than 20 weight %, the high viscosity of the an adequate adhesive power because of a deficiency in the high polymer fraction. If the amount of the second component is less than 20 weight %, this will adversely affect its wetting properties and workability.

When the composition contains a wax and an oxidation inhibitor in addition to the first and second components, the amount of said inhibitor is usually not more than 5 weight % based on the whole composition. The proportion of wax is not especially critical but should be such that the proportions of the first and second components will lie respectively within the above-defined ranges.

The hot-melt adhesive composition of this invention can be produced in any optional form by means of a hot-melt mixer, a simple extruder, a pelletizer or the like.

The hot-melt adhesive composition of this invention can be applied onto the objective material by means of, for example, a hot-melt-applicator.

The hot-melt adhesive composition according to this invention is excellent in adhesivity, especially in its bonding affinity for various substrates, and its creep characteristics. Thus, the hot-melt adhesive compositions of the present invention are very useful as adhesives for such substrate materials as metals, plastics, synthetic rubbers, paper, glasses, woods and so on. Particularly, the adhesives containing a wax, display higher heat resistance than hitherto known hot-melt adhesive compositions, e.g. an ethylene-vinylacetate copolymer containing a wax.

The following working and comparative examples are given to describe this invention in further detail. In these examples, all parts are by weight unless otherwise indicated.

EXAMPLES 1 AND 2

35 parts of 90% hydrolyzed ethylene-vinyl acetate copolymer (vinyl acetate content 28%; melt index 170 g/10 min., Manufactured and marketed by Takeda Chemical Industries, Ltd., Japan Dumilan ® D-219), 30 parts of paraffin wax, 150° F., and one of the tackifying resins indicated in Table 1 (35 parts) were admixed and the obtained composition was examined for compatibility.

The compatibility at an elevated temperature was evaluated by stirring the mixture at 160° C., allowing it to stand and observing the mixture for phase separation. The compatibility evaluation at room temperature was made by stirring the mixture at 160° C., allowing it to stand and cool and observing the mixture for phase separation. As to the samples which had not undergone phase separation, each of them was press-molded on a 1 mm-thick sheet and examined for their non-homogeniety such as exemplified by their cloudy characteristics. The results are shown in Table 1.

TABLE 1

| | Example 1 | Example 2 |
|---|---|---|
| Tackifying resin | Copolymerized C$_5$ petroleum resin | Copolymerized C$_5$ petroleum resin |
| Trade name* | Quintone ® 1500 | Quintone ® 1525 |
| Compatibility Elevated temp. | | |
| (160° C.) | o | o |
| Room tem. (20° C.) | o | o |
| Pressed sheet | | |
| Quinton | 1500 | 1525 |
| Softening point (°C.) | 100 | 125 |
| Acid value | less than 1 | less than 1 |
| Saponification value | 155-175 | 155-175 |

TABLE 1-continued

|  | Example 1 | Example 2 |
|---|---|---|
| Bromine number | 55–70 | 55–70 |
| Ash content (%) | less than 0.01 | less than 0.01 |
| Specific gravity | 1.10–1.20 | 1.10–1.20 |
| Refractive index $n_D^{25}$ | 1.550 | 1.550 |

The mark O: Compatible; no phase separation
The mark X: Phase separation
The mark : Homogenous sheet, compatible.
*Manufactured and marketed by The Japan Zeon Co.,Ltd. in Japan

EXAMPLES 3 TO 6, COMPARATIVE EXAMPLE 1

Using 90% hydrolyzed ethylene-vinyl acetate copolymer (vinyl acetate content 28 wt. %: melt index 170 g/10 min; Takeda Chemical Industries, Ltd. in Japan, Dumilan® D-219), adhesive compositions were prepared according to the recipes indicated in Table 2. By means of a hot-melt-applicator, each of the adhesive agents was applied at a temperature of 160° C. onto a 20μ-thick cellophane sheet to be a coating thickness of 20μ. After the coated cellophane sheet was dried in the air, it was laminated by heat-sealing with a 20μ-thick cellophane sheet at 160° C.

Then, using a Tensilon Tensile Tester, a peeling test was carried out at the pulling speed of 300 mm/min. to determine the T-peeling strength of the specimen.

TABLE 2

|  | Example 3 | Example 4 | Example 5 | Example 6 | Comparative Example 1 |
|---|---|---|---|---|---|
| Dumilan D-219 | 40 | 30 | 20 | 10 | — |
| Evaflex 210*[(1)] | — | 10 | 20 | 30 | 40 |
| Quintone 1500*[(2)] | 30 | 30 | 30 | 30 | 30 |
| Paraffin wax 145° F.*[(3)] | 30 | 30 | 30 | 30 | 30 |
| Melt viscosity, cps (180° C.)*[(4)] | 1,100 | 900 | 800 | 750 | 600 |
| Peeling strength (kg/15 mm) | 1,310 | 1,010 | 950 | 850 | 300 |

*[(1)]Ethylene-vinyl acetate copolymer (Melt Index 400, vinyl acetate content 28%), Manufactured and marketed Mitsui Polychemicals Co., Ltd. in Japan
*[(2)]Copolymerized $C_5$ Petroleum resin, Manufactured and marketed by Japan Zeon Co., Ltd. in Japan
*[(3)]Manufactured by Nippon Seiro Ind., Ltd. in Japan
*[(4)]Brookfield viscosity

EXAMPLES 7 TO 10, &

Comparative Examples 2 to 4

Creep tests were conducted in accordance with JIS K7115.

Using each of the adhesive compositions given in Table 3, a sheet 1 mm thick and 15 mm wide was prepared and its creep characteristics were measured under a stress of 50 g/cm² at 80° C. The results are shown in Table 3. Under these conditions, none of the hydrolyzed ethylene-vinyl acetate copolymers and the corresponding carboxyl-containing products undergo creep behavior.

TABLE 3

|  | Example 7 | Example 8 | Example 9 | Example 10 | Comparative Example 2 | Comparative Example 3 | Comparative Example 4 |
|---|---|---|---|---|---|---|---|
| Adhesive composition |  |  |  |  |  |  |  |
| Dumilan D-229*[(1)] | 35 | — | — | — | — | — | — |
| Dumilan C-2280*[(2)] | — | 35 | — | — | — | — | — |
| Dumilan C-1550*[(2)] | — | — | 35 | — | — | — | — |
| Dumilan C-1591*[(2)] | — | — | — | 35 | — | — | — |
| Evaflex 210*[(3)] | — | — | — | — | 35 | — | — |
| Evaflex 220*[(3)] | — | — | — | — | — | 35 | — |
| Evaflex 150*[(3)] | — | — | — | — | — | — | 35 |
| Quintone 1525*[(4)] | 35 | 35 | 35 | 35 | 35 | 35 | 35 |
| Paraffin wax 145° F.*[(5)] | 30 | 30 | 30 | 30 | 30 | 30 | 30 |
| Elongation after creep test (%) | 0 | 0 | 0 | 0 | Breaks after 3 min. | Breaks after 5 min. | Breaks after 10 min. |

*[(1)]Hydrolyzed ethylene-vinyl acetate copolymer (Melt Index 75, VICAT Softening point 83° C.), Manufactured and marketed by Takeda Chemical Industries, Ltd. in Japan
*[(2)]Carboxyl-containing version of the above (C-2880: grafted with acrylic acid, Melt Index 93, VICAT Softening point 78° C.; C-1550: grafted with acrylic acid, Melt Index 18, VICAT Softening point 50° C.; C-1591: grafted with acrylic acid, Melt Index 5, VICAT Softening point 92° C.), Manufactured and marketed by Takeda Industries, Ltd. in Japan
*[(3)]Ethylene-vinyl acetate copolymer (220: Melt Index 150, vinyl acetate content 28%; 150: Melt Index 30, vinyl acetate content 33%), Manufactured and marketed by Mitsui Polychemicals Co., Ltd.
*[(4)]Copolymerized $C_5$ petroleum resin, Manufactured and marketed by Nippon-Zeon Ind., Ltd. in Japan
*[(5)]Manufactured by Nippon Seiro Ind. Ltd in Japan

EXAMPLES 11 THROUGH 15

Employing carboxyl-containing products derived from hydrolyzed ethylene-vinyl acetate copolymers as the first component, various hot-melt adhesive compositions were prepared according to the recipes indicated in Table 4.

To evaluate these compositions, creep tests were conducted in accordance with the method described in Example 7. The adhesive force to aluminium metal sheets was also measured. By means of a hot-melt applicator, each of the adhesive compositions was applied at 160° C. onto a 100μ-thick aluminium sheet as a coating layer with a thickness of 20μ. After the coated sheet was dried in the air, it was laminated by heat-sealing with a 100μ-thick aluminium sheet under the conditions, at a temperature of 160° C., at an elevated pressure of 5 kg/cm² and for 5 sec. A peeling test was carried out in accordance with the method described in Example 3.

The results are shown in Table 4.

TABLE 4

|  | Example 11 | Example 12 | Example 13 | Example 14 | Example 15 | Comparative Example 5 | Comparative Example 6 | Comparative Example 7 |
|---|---|---|---|---|---|---|---|---|
| Dumilan C-2270*(1) | 70 | 70 | 70 | — | — | — | — | — |
| Dumilan C-1550*(2) | — | — | — | 70 | — | — | — | — |
| Dumilan C-1590*(1) | — | — | — | — | 70 | — | — | — |
| Evaflex 220*(2) | — | — | — | — | — | 70 | — | — |
| Evaflex 150*2 | — | — | — | — | — | — | 70 | — |
| Quinton 1500*(3) | 30 | — | — | — | — | 30 | — | — |
| YS-polyster T-115*(4) | — | 30 | — | 30 | 30 | — | 30 | — |
| Arkon P-100*(5) | — | — | 30 | — | — | — | — | 30 |
| Elongation after creep test (%) | 0 | 0 | 0 | 0 | 0 | Breaks after 5 min. | Breaks after 5 min. | Breaks after 5 min. |
| Peeling strength (kg/25mm) | 6.0 | 7.0 | 7.0 | 8.0 | 8.5 | 2.5 | 3.5 | 2.5 |

*(1)Carboxyl-containing product derived from a hydrolyzed ethylene-vinyl acetate copolymer (C-2270: grafted with acrylic acid, Melt Index 85, VICAT Softening point 63° C.; C-1590: grafted with acrylic acid, Melt Index 10, Softening point 92° C.), Manufactured and marketed by Takeda Chemical Ind., Ltd. in Japan
*(2)Ethylene-vinyl acetate copolymer, Manufactured and marketed by Mitsui Polychemicals Co., Ltd, in Japan
*(3)Copolymerized C5 petroleum resin, Manufactured and marketed by Japan Zeon Co., Ltd. in Japan
*(4)Terpene-Phenol Copolymer (Softening point 115° C., MW 720), Manufactued and marketed by Yasuhara Oil Ind., Ltd. in Japan
*(5)Hydrogenated aromatic petroleum resin (Softening point 100° C.), Manufactured and marketed by Arakawa Chemicals Co., Ltd. in Japan

What is claimed is:

1. A hot-melt adhesive composition containing:
   (i) a first component consisting of (a) 20 to 100 weight percent of a hydrolyzed ethylene-vinyl acetate copolymer whose vinyl acetate unit content is in the range of 5 to 50 weight percent and its hydrolysis degree is at least 50 percent and/or a carboxyl-containing product obtained by grafting said copolymer with a carboxyl-containing unsaturated compound or anhydride thereof and (b) 0 to 80 weight percent of a resin compatible with said copolymer and/or said carboxyl-containing product,
   (ii) a second component which is a dicyclopentadiene petroleum resin, the proportion of said first component being not less than 20 weight percent and that of said second component being not less than 20 weight percent, both based on said two components, and
   (iii) a wax as a third component.

2. A hot-melt adhesive composition as claimed in claim 1, wherein the proportion of the first component is 30 to 70 weight % and that of the second component is 30 to 70 weight %.

3. A hot-melt adhesive composition as claimed in claim 1, wherein a carboxyl-containing unsaturated compound is acrylic acid.

4. A hot-melt adhesive composition as claimed in claim 2, wherein the resin compatible with said copolymer and said carboxyl-containing product is an ethylene-vinyl acetate copolymer.

5. A hot-melt adhesive composition as claimed in claim 1, wherein the tackifying resin is terpene-phenol copolymer.

6. A hot-melt adhesive composition as claimed in claim 1, wherein the tackifying resin is dicyclopentadiene petroleum resin.

7. A hot-melt adhesive composition as claimed in claim 1, wherein the tackifying resin is hydrogenated aromatic petroleum resin.

8. A hot-melt adhesive composition as claimed in claim 1, wherein the hydrolysis degree of the hydrolyzed ethylene-vinyl acetate copolymer is 90 percent.

9. A hot-melt adhesive composition containing:
   (i) a first component consisting of (a) 20 to 100 weight percent of a hydrolyzed ethylene-vinyl acetate copolymer whose vinyl acetate unit content is in the range of 5 to 50 weight percent and its hydrolysis degree is at least 50 percent and/or a carboxyl-containing product obtained by grafting said copolymer with a carboxyl-containing unsaturated compound or anhydride thereof and (b) 0 to 80 weight percent of a resin compatible with said copolymer and/or said carboxyl-containing product and
   (ii) a second component which is a tackifying resin selected from the group consisting of a terpene-phenol copolymer, a dicyclopentadiene petroleum resin and a hydrogenated aromatic petroleum resin, the proportion of said first component being not less than 20 weight percent and that of said second component being not less than 20 weight percent, both based on said two components.

* * * * *